(12) United States Patent
Radermacher et al.

(10) Patent No.: US 7,922,466 B2
(45) Date of Patent: Apr. 12, 2011

(54) RADIAL FAN

(75) Inventors: Bernhard Radermacher, Mönchengladbach (DE); Frank Diedrichsen, Wuppertal (DE); Achim Von Kathen, Wuppertal (DE)

(73) Assignee: Gebr. Becker GmbH, Wuppertal (DE)

( * ) Notice: Subject to any disclaimer, the term of this patent is extended or adjusted under 35 U.S.C. 154(b) by 191 days.

(21) Appl. No.: 11/921,714

(22) PCT Filed: May 31, 2006

(86) PCT No.: PCT/EP2006/062756
§ 371 (c)(1),
(2), (4) Date: Jan. 9, 2008

(87) PCT Pub. No.: WO2006/131470
PCT Pub. Date: Dec. 14, 2006

(65) Prior Publication Data
US 2009/0028730 A1    Jan. 29, 2009

(30) Foreign Application Priority Data

Jun. 6, 2005 (DE) .......... 10 2005 025 857
Jun. 6, 2005 (DE) .......... 10 2005 025 858
Jun. 6, 2005 (DE) .......... 10 2005 025 865

(51) Int. Cl.
*F04D 29/40* (2006.01)
*F03B 11/02* (2006.01)

(52) U.S. Cl. ........ 417/423.14; 417/423.1; 415/108; 415/214.1

(58) Field of Classification Search .......... 417/423.2, 417/423.8, 423.14, 423.1; 415/108, 119, 415/177, 182.1, 185, 186, 189, 205, 214.1, 226, 215.1, 14.12
See application file for complete search history.

(56) References Cited

U.S. PATENT DOCUMENTS

| | | | | |
|---|---|---|---|---|
| 2,642,004 A | * | 6/1953 | Bergh | 415/108 |
| 2,748,568 A | * | 6/1956 | Budworth | 60/804 |
| 2,865,299 A | * | 12/1958 | Hornschuch et al. | 415/131 |
| 3,272,137 A | * | 9/1966 | Maitlen et al. | 415/157 |

(Continued)

FOREIGN PATENT DOCUMENTS

DE    27 06 110    8/1978

(Continued)

OTHER PUBLICATIONS

Silicon carbide, http://en.wikipedia.org/w/index.php?title=Silicon_carbide&oldid=384207959 (last visited Sep. 11, 2010).*

*Primary Examiner* — Devon C Kramer
*Assistant Examiner* — Leonard J Weinstein
(74) *Attorney, Agent, or Firm* — Collard & Roe, P.C.

(57) ABSTRACT

The invention relates to a radial fan (1), preferably a high-speed radial fan, comprising a blower wheel (8), a housing (2) which receives a rotor (6) and a stator (5) of an electrical drive (4) of the blower wheel shaft (7), and a cooling system. The aim of the invention is to develop one such radial fan in terms of the cooling system required. To this end, paths (30, 37) for a first cooling medium (K1) and a second cooling medium (K2) are provided in the housing (2), the second cooling medium (K2) being cooled by the first cooling medium (K1) as provided for by the housing (2), and the paths (30, 37) are separated from each other by intact material walls (40) of the housing (2).

16 Claims, 14 Drawing Sheets

U.S. PATENT DOCUMENTS

| | | | |
|---|---|---|---|
| 3,411,450 A * | 11/1968 | Clifton | 417/420 |
| 3,652,176 A | 3/1972 | Walsh | |
| 4,099,890 A * | 7/1978 | Murakami et al. | 415/200 |
| 5,332,359 A * | 7/1994 | Palgon et al. | 415/182.1 |
| 5,364,229 A * | 11/1994 | Fujihara et al. | 415/163 |
| 5,385,444 A * | 1/1995 | Kobayashi et al. | 415/182.1 |
| 5,857,348 A | 1/1999 | Conry | |
| 6,193,463 B1 * | 2/2001 | Adeff et al. | 415/196 |
| 6,227,802 B1 * | 5/2001 | Torgerson et al. | 415/199.2 |
| 6,537,024 B2 * | 3/2003 | Chien et al. | 415/200 |
| 6,638,007 B2 | 10/2003 | Bartholomä et al. | |
| 6,872,051 B2 * | 3/2005 | Miyazaki et al. | 415/213.1 |
| 6,997,686 B2 * | 2/2006 | Agrawal et al. | 417/350 |
| 7,476,081 B2 * | 1/2009 | Higashimori et al. | 416/185 |
| 2004/0005228 A1 | 1/2004 | Agrawal et al. | |
| 2004/0179947 A1 * | 9/2004 | Agrawal et al. | 417/212 |
| 2005/0158194 A1 * | 7/2005 | Sloan et al. | 417/423.11 |

FOREIGN PATENT DOCUMENTS

| | | |
|---|---|---|
| DE | 101 07 807 | 7/2002 |
| DE | 202 01 118 | 7/2003 |
| EP | 0 650 690 | 5/1995 |
| WO | WO 99/13223 | 3/1999 |
| WO | WO 2004/036052 | 4/2004 |

* cited by examiner

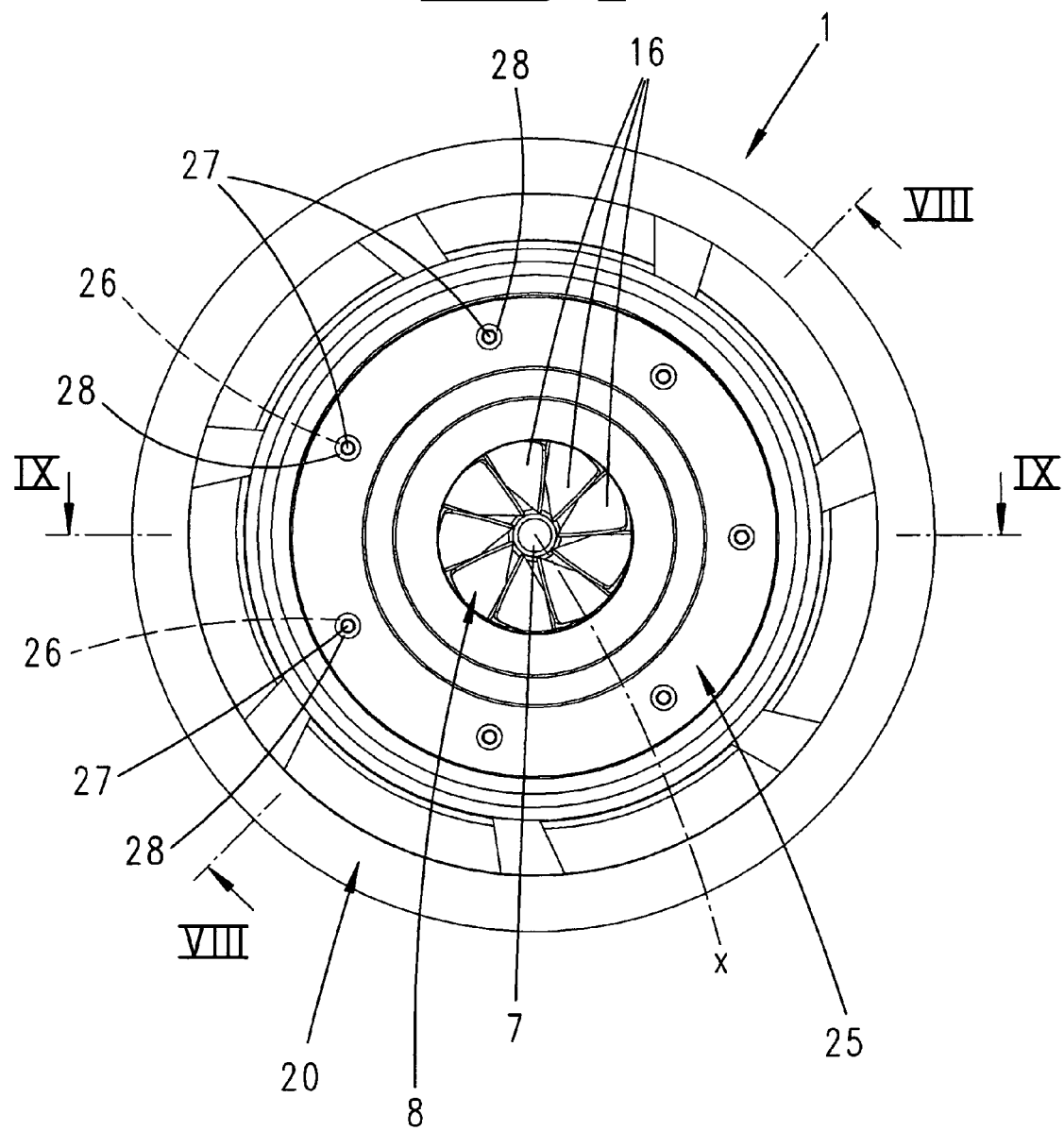

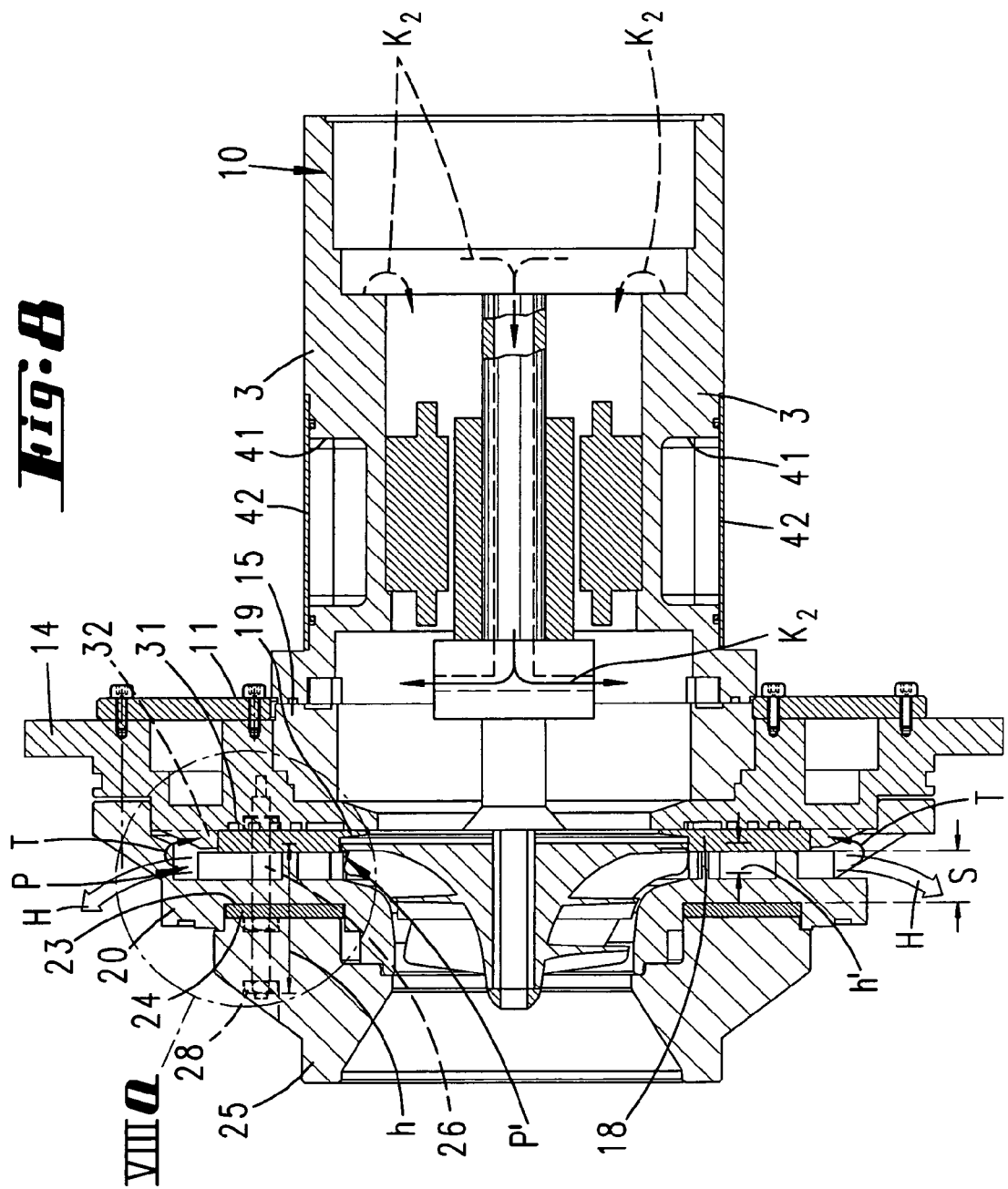

RADIAL FAN

CROSS REFERENCE TO RELATED APPLICATIONS

Applicants claim priority under 35 U.S.C. §119 of German Application No. 10 2005 025 865.4 filed Jun. 6, 2005, German Application No. 10 2005 025 857.3 filed Jun. 6, 2005, and German Application No. 10 2005 025 858.1 filed Jun. 6, 2005. Applicants also claim priority under 35 U.S.C. §365 of PCT/EP2006/062756 filed May 31, 2006. The international application under PCT article 21(2) was not published in English.

The invention relates to a radial fan, preferably high-speed radial fan, having an impeller and a housing, the housing accommodating a rotor and a stator of an electric drive for the impeller shaft, and a cooling means being provided.

Radial fans of the type in question, in particular radial fans which rotate at high speeds, are known and are used, for example, in conjunction with lasers. Since considerable thermal loads have to be dissipated here, a cooling means is provided.

In respect of the prior art described above, it is considered to be an object of the invention to improve further a radial fan of the type in question in respect of the cooling required.

Since it is also the case with such radial fans that considerable thermal loads have to be dissipated, it is also an object of the invention to configure such a radial fan advantageously in respect of the necessary cooling means.

Furthermore, it is also intended for the impeller, which is driven by an electric drive accommodated in the housing, to be configured advantageously in safety terms.

The first object is achieved first and foremost by the invention in a first aspect which is based on the fact that paths are provided in the housing for a first cooling medium and a second cooling medium, for cooling of the second cooling medium by the first cooling medium by means of the housing, and that these paths are separated from one another by uninterrupted material walls of the housing. This accordingly provides a sealing-free system which allows two-fold cooling of the radial fan, in particular of the housing and/or the rotor/stator region thereof, namely by a first cooling medium and a second cooling medium, the second cooling medium serving for secondary cooling, while the first cooling medium provides primary cooling. The paths of the two cooling media are separated hermetically from one another, this separation being achieved by way of material walls of the housing itself. For this purpose, the fan housing preferably consists of a casting material such as, in particular, a lightweight material, for example aluminum, which is formed with thick walls.

The subject matters of further developments are explained hereinbelow.

Thus, in a preferred configuration, it is provided that the paths in the housing run at an angle in relation to one another, that is to say, when seen three-dimensionally, they are not parallel to one another. Rather, the paths of the two cooling media, in a projection, enclose for example an acute angle, which results, in a projection, in the cooling-media paths crossing. A preferred configuration is one in which the paths run perpendicularly to one another, in which case, for example, paths of the first cooling medium extend parallel to the impeller-shaft axis, while the paths of the second cooling medium run substantially in the circumferential direction in relation to the impeller-shaft axis. The paths are formed in the housing in the casting process and/or as bores. It is thus possible, during the casting operation for producing the housing, to form these paths at the same time. As an alternative, in particular in the case of a solid housing component, the paths may be formed by bores. The paths of the first cooling medium are preferably disposed in the outer wall of the housing, in a cross-sectionally chamber-like housing recess. This chamber-like housing recess is formed in the housing preferably during the production process, therefore, in particular, during production by casting. The chamber-like housing recess is open in the radially outward direction in relation to the housing and, furthermore, two circumferentially distributed paths of the first cooling medium are routed in the chamber-like housing recess. Correspondingly, two consecutive paths of the first cooling medium open out, preferably in the circumferential direction, in a housing recess. In a preferred configuration of the subject matter of the invention, it is provided that three or more chamber-like housing recesses are provided over the circumference, further preferably four such housing recesses, which are distributed uniformly in the circumferential direction. In the axial direction of the housing, the chamber-like housing recesses are bounded by integral walls of the housing. Also in the circumferential direction, two adjacent chamber-like housing recesses are separated from one another by a solid portion of the housing, which solid portion has at least one path for the first cooling medium passing through it in order to connect these adjacent chamber-like housing recesses. The chamber-like housing recesses are closed by a covering extending in the axial direction of the housing. As a result, the chamber-like housing recesses, which are enclosed on all sides, form part of the path for the first cooling medium. Accordingly, taking account of housing recesses distributed over the circumference and of paths which are provided in each case between two adjacent housing recesses, and pass through the housing portion, a circuit is provided in the circumferential direction of the housing. The covering may be in the form of a tubular part which encloses the housing. As an alternative, it is also possible for plate-like individual coverings to be associated with each chamber-like housing recess. The significant factor here is for each individual housing recess to be closed in a sealing manner. One chamber-like housing recess is preferably formed as a cooling-medium infeed and a further chamber-like housing recess is formed as a cooling-medium discharge. Accordingly, associated with these housing recesses, or the coverings or covering portions which close the same, there are preferably provided couplings or the like for the connection of external pipe or hose portions. It is also proposed that the housing be cylindrical, one end being associated with the impeller and the other end being closed via a foot part, for hermetically sealing the housing, which contains the paths for the cooling media and accommodates the electric drive for the impeller shaft. For sealing closure, it is further provided that the other end has a stepped formation, and the foot part is stepped correspondingly. In particular this stepped formation results in sealing of the second cooling-medium path with respect to the exterior. Furthermore, the foot part may form, at the same time, in the direction of the housing interior, portions of paths for the second cooling medium. In addition, the foot part may have plug-like inlets for the power supply, on the one hand, and possibly the sensor system and associated electronics, on the other hand. Cooling-related advantages are achieved in that the paths of the first cooling medium run further toward the inside, as seen in the radial direction, than the paths of the second cooling medium at least in the region between the chamber-like housing recesses, the second cooling medium also passing through the interior of the housing. The paths of the second cooling medium thus preferably run parallel to the axial alignment of the impeller shaft in the region of the solid housing portions which separate two circumferentially adjacent, chamber-like housing recesses from one another. These solid housing portions have both the paths of the first cooling medium passing through them in one direction and the paths of the second cooling medium passing through them preferably perpendicularly thereto. As an alternative, it is also possible for the paths of the first cooling medium to be provided further toward the outside, as seen in the radial direction, than the paths of the second cooling medium. Furthermore, in a preferred configuration, it is provided that the paths of the first cooling medium run in the circumferential direction in relation to the impeller-shaft axis. A plurality of paths which are positioned axially one behind the other, and are brought together in each case in the chamber-like housing recesses, are provided here. This multiplicity of paths for the first cooling medium is restricted, further preferably, to the region of the electric drive in the housing. The paths of the second cooling medium extend, further preferably, over more or less the entire axial length of the housing from the impeller to the foot part provided opposite. Thus, in a development of the subject matter of the invention, it is provided that the paths of the first cooling medium, predominantly for the purpose of dissipating the power loss of the stator, are brought close to the stator such that the thickness of the housing material remaining between the paths and the stator which is to be cooled corresponds to, or is less than, a cooling-medium-path diameter. It is also proposed that axial bores which correspond to the paths for the second cooling medium, and are used for accommodating electric lines, be provided. It is thus extremely easy to provide for axial lead-through of electric lines while, at the same time, ensuring insulation in relation to the first cooling system.

The object in respect of the cooling system is achieved first and foremost by the invention in another aspect which is based on the fact that cooling in particular of the drive is achieved by a partial gas stream separated off from the gas which is to be compressed. This gives rise to a cooling system by means of which, with hermetic closure with respect to the exterior, considerable thermal loads can be dissipated. For this purpose, the gas which is compressed in any case by the radial fan is used for self-cooling of the fan drive, in particular of the housing region which accommodates the rotor and stator, in which case the branched-off partial gas stream, which serves for cooling purposes, is channeled specifically through the housing and/or through the rotor/stator region. In addition, this branched-off partial gas stream, after passing through the cooling route, is fed back to the main gas stream developed by the fan impeller. Hermetically sealed cooling of the radial fan with respect to the exterior is achieved as a result. In a preferred configuration, it is thus possible to realize a sealing-free system.

The subject matter of a further development is explained hereinbelow.

Thus, in a preferred development of the subject matter of the invention, it is provided that cooling of the partial gas stream takes place by way of contact with the housing wall, which, for its part, is actively cooled. It is thus possible for the partial gas stream to be channeled through channels which are appropriately provided in the housing, and along the walls of which heat exchange takes place.

The invention also relates to a radial fan, an improvement in the cooling capacity being achieved in that a partial gas stream separated off from the gas which is to be compressed is channeled, following separation, into paths of a cooling-channel housing, which, for its part, is actively cooled at least indirectly. This results in (preliminary) cooling of the partial gas stream, in first instance primarily by way of contact with the housing walls which delimit the housing paths and also, secondarily, by way of separate active cooling of the cooling-channel housing and thus of the walls of the housing paths. The housing has good thermal conductivity for this purpose and, further preferably, consists of a metal material, in particular a light-metal material, for example in the form of an aluminum casting. In order to improve the cooling capacity further, an active cooling means for the housing is also provided, this means absorbing, and dissipating, the heat which is given up by the partial gas stream via the housing wall.

The subject matters of further developments are explained hereinbelow.

The housing paths may be labyrinthine. This makes it possible to achieve large-surface-area preliminary cooling of the partial gas stream by way of contact with the housing wall in the labyrinthine housing path, the housing paths, further preferably, leading radially inward from the outside. It is also proposed that the partial gas stream be branched off from the main gas stream radially outside the impeller, in the region of a diffuser, specifically preferably at the outlet from the diffuser. Use is made here of the difference in pressure which prevails, during operation of the radial fan, between the higher pressure at the diffuser outlet and the lower pressure in the motor housing and/or in the region where the partial gas stream re-enters the main gas stream at the outer periphery of the impeller and/or at the diffuser inlet, in order thus to achieve an automatically operating partial gas cooling circuit within the fan housing. The partial gas stream is accordingly forced through the fan housing and the electric drive for cooling purposes. It is provided that the partial gas stream is channeled radially inward in first instance and then passes through the housing wall of the housing region which accommodates the electric drive, thus preferably parallel to the impeller axis, furthermore a plurality of such channels or the like for the partial gas stream being provided in the housing around the impeller axis, as seen in cross-section. It is at that end of the electric drive which is directed away from the impeller that the partial gas stream is preferably channeled out of the housing into the interspace between the stator and rotor, accordingly passing over the surfaces of the rotor and stator for heat dissipation. As an alternative, or also in combination therewith, it may be provided that the drive shaft is in the form of a hollow shaft, and that it is at that end of the electric drive which is directed away from the impeller that the partial gas stream is channeled out of the housing into the drive shaft, in order to pass through the latter centrally in the direction in which the drive shaft extends, heat dissipation taking place by way of contact with the shaft wall. In the case of a combined solution in which the partial gas stream is channeled both through the drive shaft, in the form of a hollow shaft, and through the interspace between the stator and rotor, these two partial gas streams are preferably brought together downstream of the rotor and/or stator, as seen in the flow direction, and furthermore the flow direction of the partial gas stream as it passes through the interspace between the stator and rotor and as it passes through the hollow shaft being counter to the flow direction of the partial gas stream which, coming from the labyrinthine housing path, passes through the housing in the direction of the end which is directed away from the impeller. Finally, the partial gas stream is channeled back into the main gas stream at the radially outer periphery of the impeller. A lower pressure prevails at this location than in the radially outer position in the region of the diffuser outlet, at which the partial gas stream is branched off from the main gas stream, and a differential-pressure-controlled circuit is accordingly established. In a preferred configuration of the subject matter of the invention, it is provided that the active cooling means of the housing is in the form of a water cooling means. This water cooling means, which forms a secondary cooling means, is separated hermetically from the gas cooling means, which forms the primary cooling means, furthermore basically a sealing-free system being present. Finally, it is provided that the gas consists of helium and/or nitrogen and/or is air and/or is a mixture of two or more of the gases mentioned.

The object, mentioned in the introduction, relating to the safety aspect is achieved first and foremost by the invention in another aspect which is based on the fact that, in order to form a cage which encloses the impeller, cage plates are provided on the cover side and underside of the impeller, and these cage plates are held together around the periphery of the impeller by, for example, stud-like connecting means, at least the connecting means and the cover-side cage plate consisting of a hard and tough material such as steel. This configuration provides a safeguard against bursting. This prevents, in first instance in the event of the impeller bursting, the cover-side housing part, which consists of a light-metal casting material, from being lifted off and/or destroyed. Such a situation where the cover is lifted off and/or destroyed would result in enlargement of the air gap which, in the case of a radial fan, opens outward, and relatively large fragments of the ruptured impeller could escape at high speed through this enlarged gap. This risk is countered by the provision of the cover-side cage plate, which consists of a hard and tough material such as steel, furthermore, for example, ST 50. This cover-side cage plate forms a protective shield for the cover disposed at the rear, that is to say on that side of the cage plate which is directed away from the impeller. It is also the case that the cage plates provided on the cover side and underside of the impeller are secured against displacement—both in the radial and in the axial directions—stud-like connecting means being provided for this purpose. These connecting means keep the cage plates at a predetermined, axial spacing. Since, according to the invention, these connecting means also consist of a hard and tough material such as steel, they are also protected against being destroyed by fragments resulting from bursting.

The subject matters of further developments are explained hereinbelow.

It is thus provided that, in order to form the cover, the housing is divided parallel to a plane of revolution of the impeller. Furthermore, it proves to be particularly advantageous if both cage plates consist of a hard and tough material such as steel, furthermore, for example, such as ST 50. As a result of this configuration, the cage enclosing the impeller is formed entirely from a hard and tough material. The radial air-outlet gap as seen in thickness directions, that is to say as measured parallel to the impeller axis, is selected such that, in the event of the impeller bursting, in the worst-case scenario only small fragments can pass radially outward. Larger, and thus also more dangerous, fragments cannot pass through this annular gap since the cage provided does not allow any widening of the gap. In addition to the cover mentioned, it is also possible for the housing to be in the form of a light-metal casting, and thus, furthermore, for example made of aluminum. The cage plate which encloses the impeller on the underside also protects such a light-metal housing against being destroyed by fragments. In a preferred configuration, the connecting means are screw-connected both in the housing and in the cover and, accordingly, additionally form a connection between the housing and cover which is resistant to fracture and impact. Force transmission in the event of bursting takes place primarily via steel nuts which are screwed onto the connecting means, support the cage plates at the rear and counteract any enlargement of the gap between the cage plates. As an alternative to a steel nut, it is also possible for a steel collar to be formed on the connecting means. A diffuser part is preferably disposed beneath the housing cover, the cover-side cage plate being disposed between the housing cover and the diffuser part. The connecting means here also pass through the diffuser part for screw-connected engagement in the housing cover. In a development of the subject matter of the invention, it is provided that a first housing part is disposed beneath the impeller and a cooling-channel cover is fitted on the side of the first housing part which is directed away from the impeller. The underside cage plate is preferably disposed between the impeller and the first housing part. In addition, the first housing part may have cooling channels which are closed by the cooling-channel cover disposed on the underside. The housing, which accommodates the electric drive for the impeller, is fastened on the first housing part, which forms a cooling-channel housing. The connecting means are secured, at one end, in the cooling-channel housing and, at the other end, preferably in the housing cover, with the interposition of the two cage plates and of the diffuser and of the first housing part. For screw-connection, the connecting means, in a preferred configuration, are in the form of studs which have screw threads at the ends. In addition, it is proposed that the cage plates be in the form of annular parts, further preferably with a cage-plate internal diameter which is adapted to the external diameter of the impeller, and therefore, furthermore, with a slight oversize in relation to the external diameter of the impeller. The radial extent of the annular part corresponds to a radial dimension of the impeller or less, and therefore, furthermore, approximately to a third, a quarter, half or also two thirds or three quarters or also even further fractions of the radial extent. The impeller has blades, having different heights in the radial direction, the gap formed by the cage plates overlapping only part of the height of the blades, to be precise that part which corresponds at least to the height of the blades at their greatest radial extent. Accordingly, the gap between the cage plates is adapted to the axial extent of the impeller or of its blade in the radially outer region. Accordingly, the extent of the gap is only a fraction of the axially measured overall height of the impeller, that is to say a fraction of the maximum height of the blades. The gap thus corresponds preferably approximately to half the maximum blade height, but, in addition, may also correspond approximately to a quarter, a third or also two thirds to three quarters of the maximum blade height. In addition, it is provided that the lower cage plate extends axially into a foot region of the blades, and, further preferably, engages beneath the impeller in the radially inward direction. Accordingly, the lower cage plate is provided with a recessed portion which is adapted to the maximum external radius of the impeller, and in which the impeller is positioned. That portion of the lower cage plate which is provided for engaging beneath the impeller has a radial extent which corresponds approximately to the smallest height of the blades at their greatest radial extent. In order for the cage to be resistant to fracture and impact, it is further provided that, in the case of the impeller having a diameter of 100 millimeters or more in the foot region, at least one connecting stud is provided for each 25 millimeters of diameter. Accordingly, in the case of an impeller having a diameter of 100 millimeters or more, at least four connecting studs are provided, and these, in addition, are distributed uniformly over the circumference. In this respect, it is further preferred if, in the case of a diameter of 150 millimeters, six or more connecting studs, for example seven, eight or ten connecting studs, are distributed at uniform angles over the circumference, which connecting studs are all anchored preferably by screw-connection, at one end, in the housing cover and, at the other end, in the cooling-channel cover.

The invention is explained in more detail hereinbelow with reference to the accompanying drawing, which merely illustrates exemplary embodiments and in which:

FIG. 7 shows the front view of the radial fan;

FIG. 8 shows the section through the radial fan along line VIII-VIII in FIG. 7;

Figure 1:
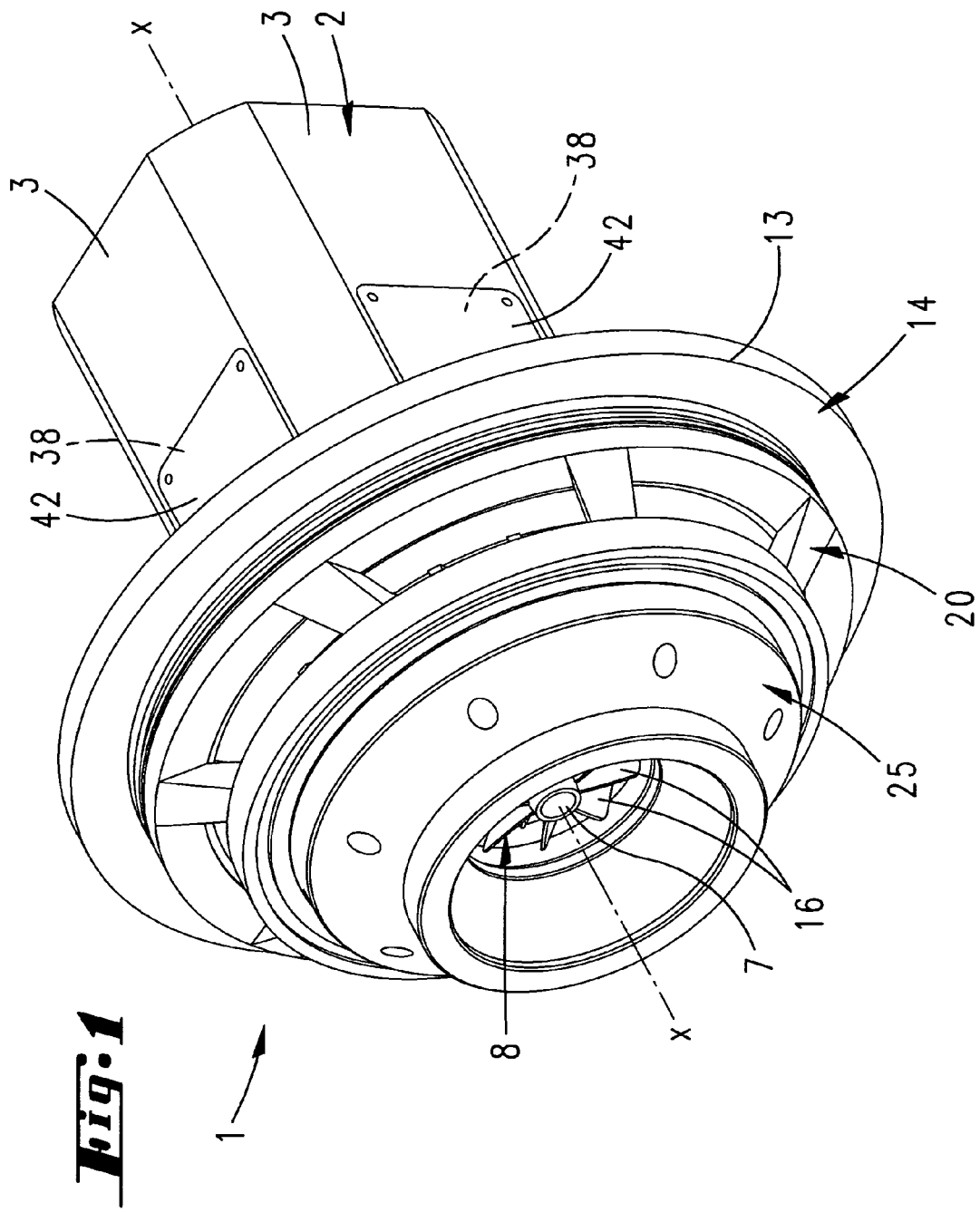
FIG. 1 shows a perspective illustration of a radial fan according to the invention.
Figure 2:
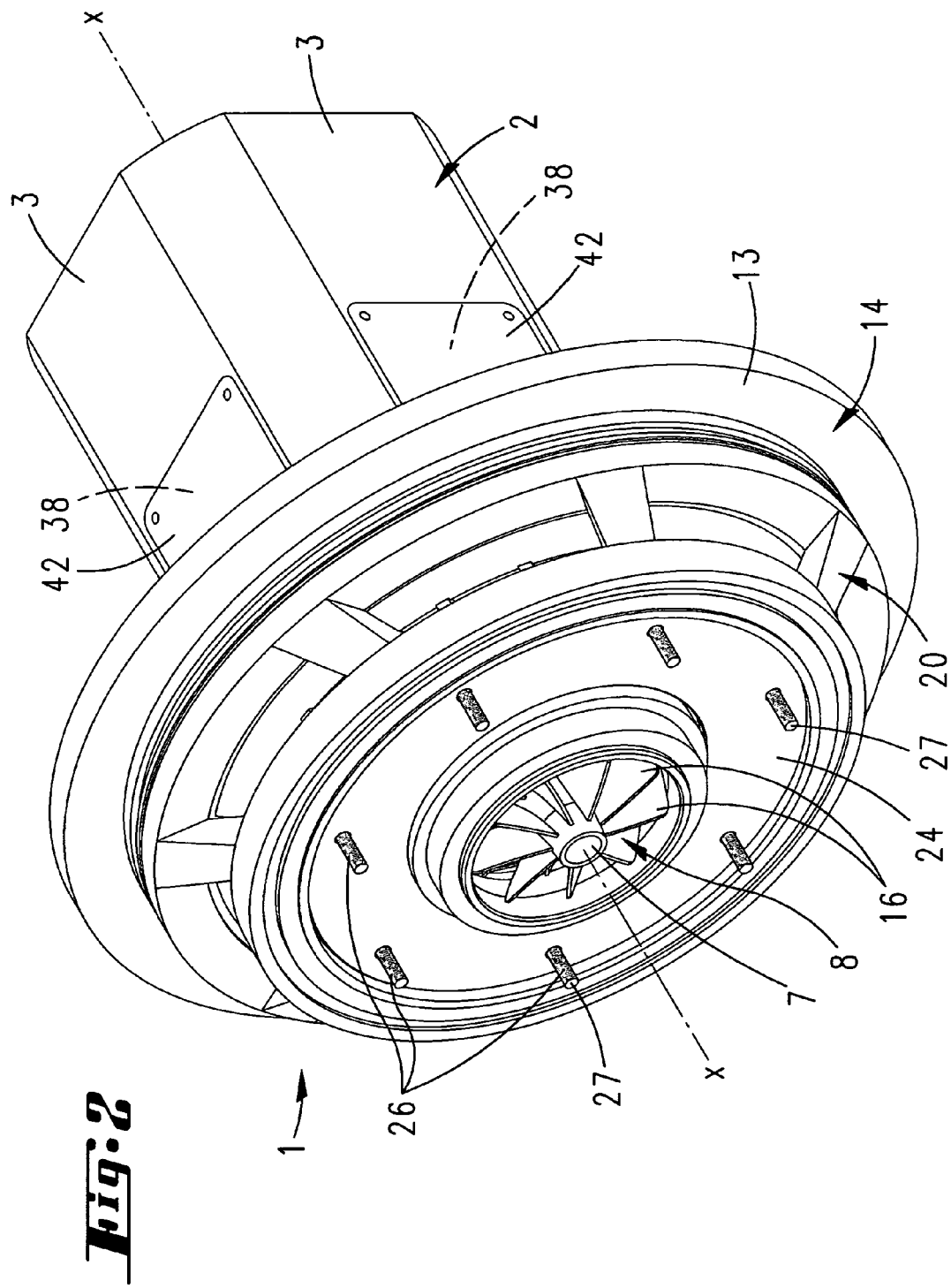
FIG. 2 shows a perspective illustration corresponding to FIG. 1, but following removal of a cover in order to expose a first cage plate.
Figure 3:
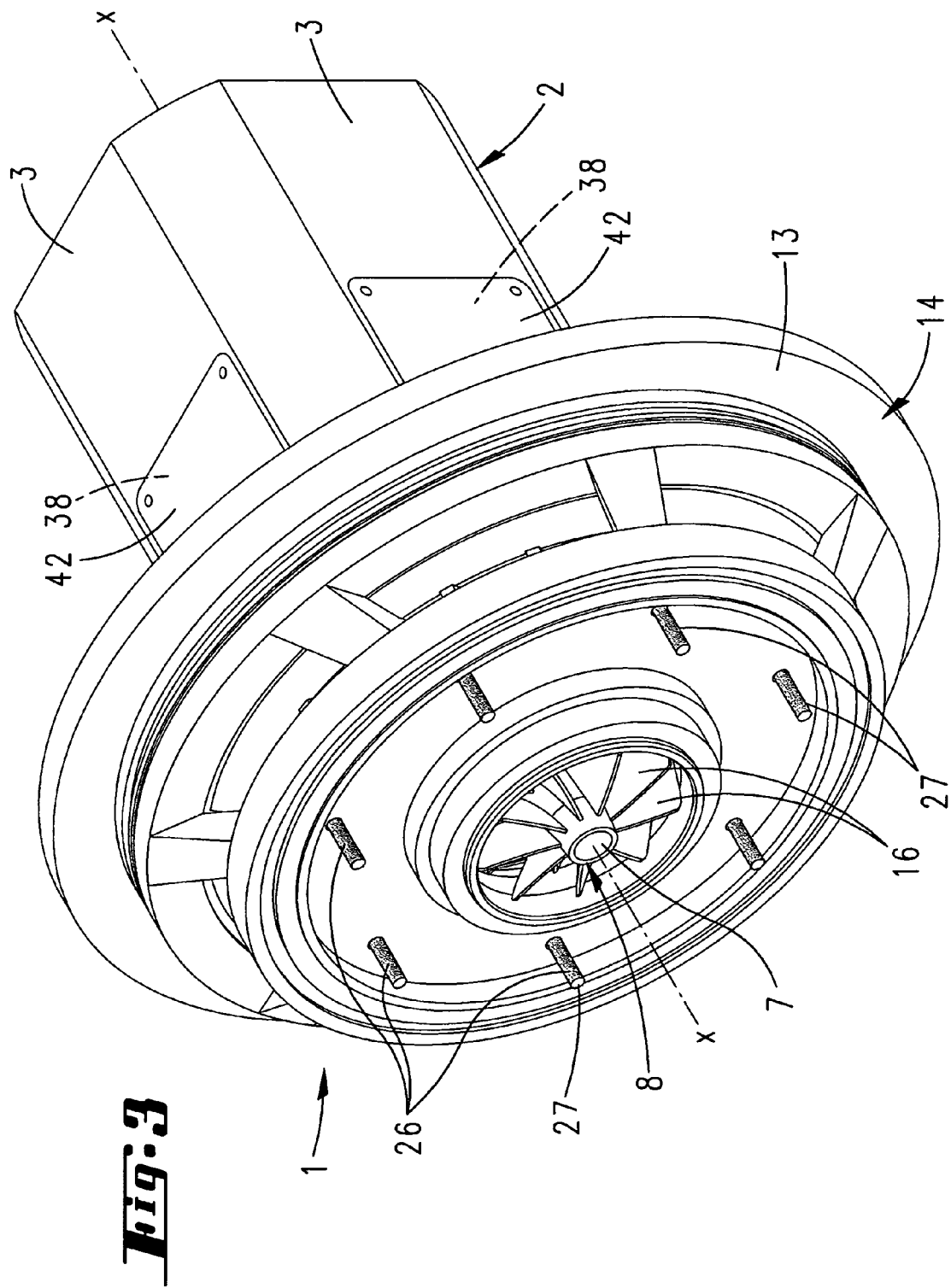
FIG. 3 shows an illustration corresponding to FIG. 2, but following further removal of the cage plate in order to expose a diffuser.
Figure 4:
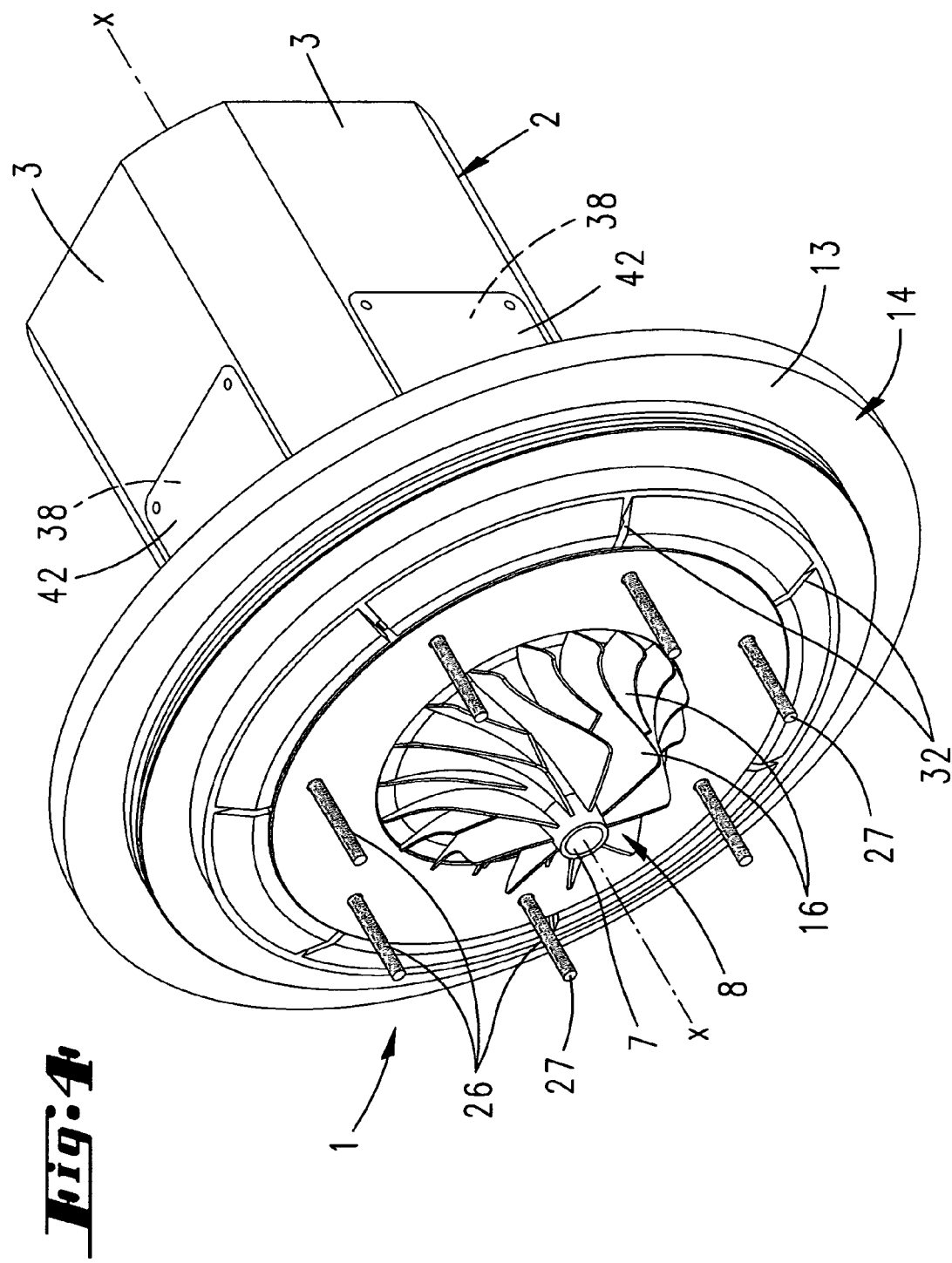
FIG. 4 shows a further illustration according to FIG. 1, but following removal of the diffuser in order to expose a second cage plate and an impeller.
Figure 5:
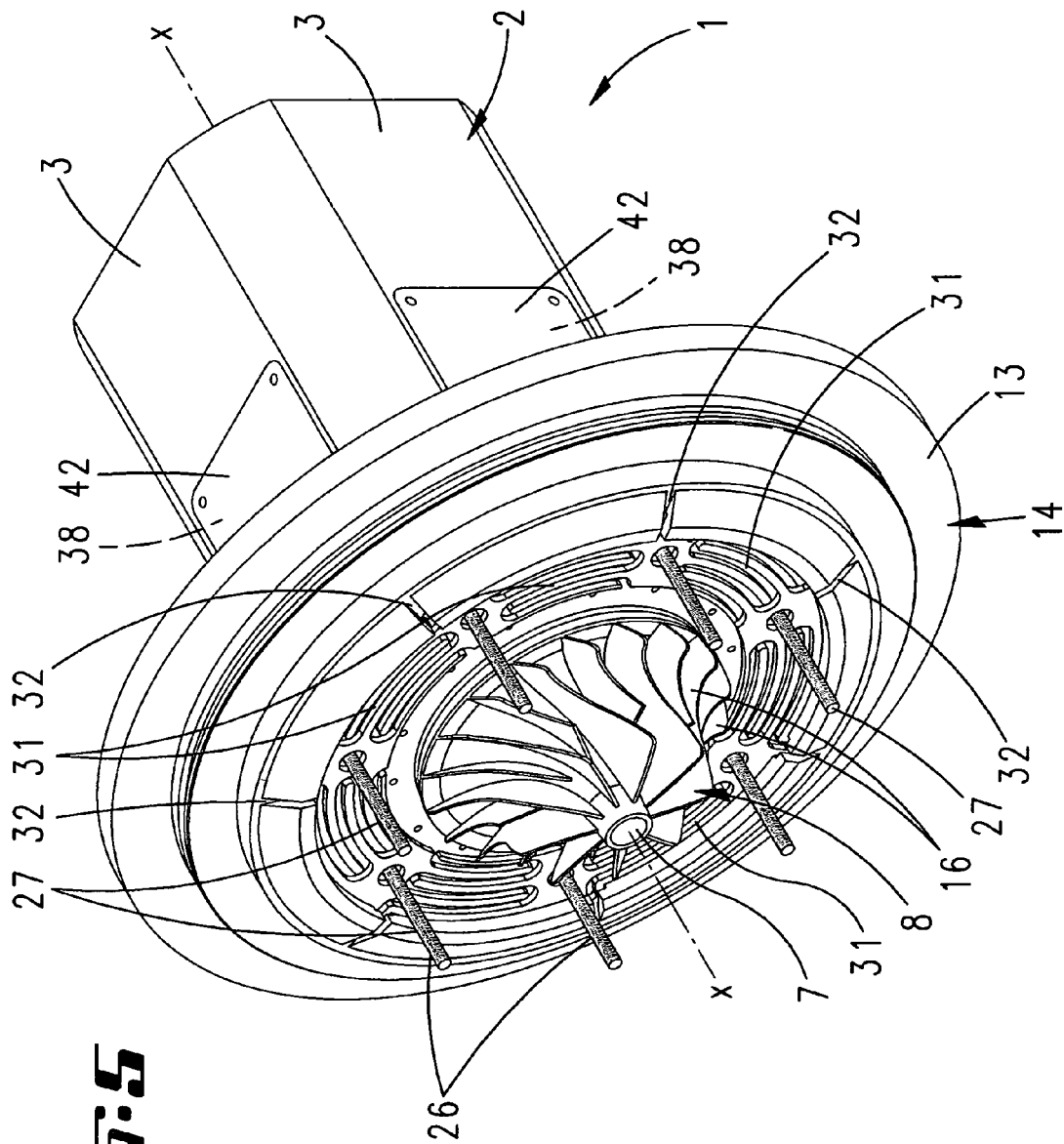
FIG. 5 shows a further perspective illustration according to the illustration in FIG. 2, but following removal of the second cage plate in order to expose a housing part containing a labyrinthine housing path.
Figure 6:
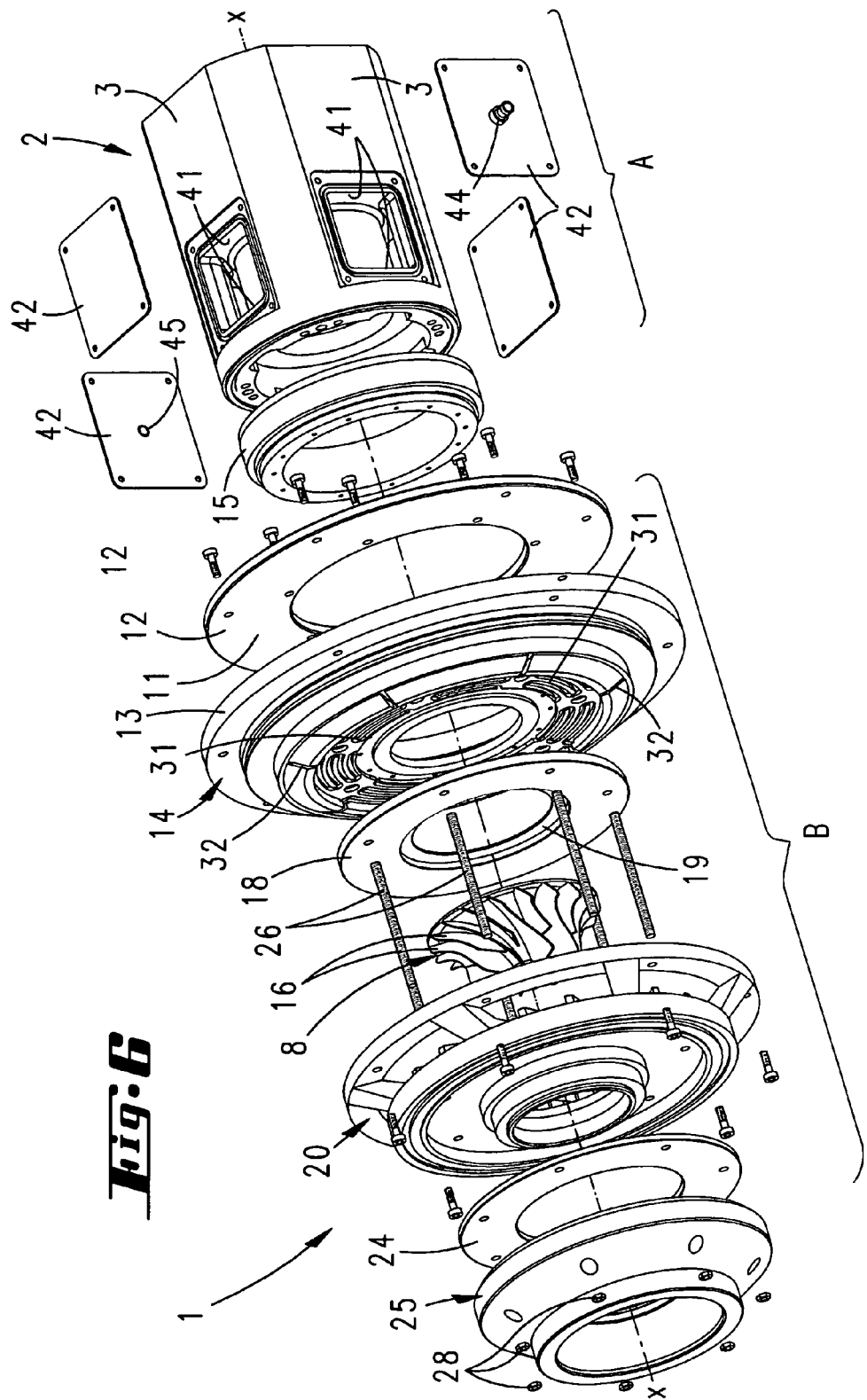
FIG. 6 shows an exploded perspective view of the radial fan, the electric drive which is required for driving the impeller having been left out.

A first embodiment of a radial fan 1, which is in the form of a high-speed radial fan, will be illustrated and described in first instance with reference to the illustrations in FIGS. 1 to 6.

This radial fan 1 has a drive portion A and a fan portion B associated therewith.

The drive portion A has a housing 2. The latter is in the form of a light-metal casting and, in the end region which is directed toward the fan portion B, is hollow-cylindrical with a round cross-section. This cross-section continues substantially over the entire longitudinal extent of the housing 2, but with plane surfaces 3, which are positioned in the manner of secants in relation to the circle cross-section, being formed. Four plane surfaces 3 are provided in this respect, and these are disposed in a square arrangement as seen in the cross-section according to the illustration in FIG. 10. Correspondingly, the corner regions of the square cross-section are rounded by the radius of the annular housing portion.

In the housing 2, an electric drive 4 is accommodated, having a stator 5 and a rotor 6. The latter forms a drive shaft 7 in the form of a shaft, specifically a hollow shaft.

The drive-shaft axis x coincides with the longitudinal axis of the housing. Mounting of the drive shaft 7 is effected via bearings (not illustrated specifically), for example magnetic bearings.

The drive shaft 7 extends beyond the annular end portion of the housing 2, as seen in plan view, for the rotationally fixed connection of an impeller 8 of the fan portion B.

That end of the housing 2 which is directed away from the impeller 8 is closed by a foot part 9. For this purpose, the housing 2, which is generally in the form of a hollow body, has a stepped formation 10, in which the correspondingly stepped foot part 9 is positioned in a sealing manner.

The fan portion B is made up substantially of rotationally symmetrical components disposed one behind the other along the shaft axis x.

The fan portion B thus has, in first instance, a cooling-channel cover 11. This cooling-channel cover 11 is followed—as seen in the shaft-axis direction away from the housing 2—by a cooling-channel housing 14, which forms a first housing part 13. This cooling-channel housing is screw-connected to the cooling-channel cover 11 in order to cover that side of the cooling-channel housing 14 which is directed toward the housing 2.

A further annular part which is designated by the numeral 15 forms a constituent part of the drive portion A and is screw-connected to the housing 2.

It is also the case that the first housing part 13 or the cooling-channel housing 14 is formed as an annular component in plan view, having a free internal diameter which is reduced in relation to the annular cooling-channel adapter part 15. The internal diameter of the cooling-channel adapter part 15 is adapted to the free internal diameter of the facing annular housing portion.

In addition, the free internal diameter of the cooling-channel housing 14 is selected to be somewhat smaller than the maximum external diameter of the impeller 8, which is further positioned on that side of the cooling-channel housing 14 which is directed away from the cooling-channel cover 11, and is connected there to the drive shaft 7 in a rotationally fixed manner.

Figure 8A:
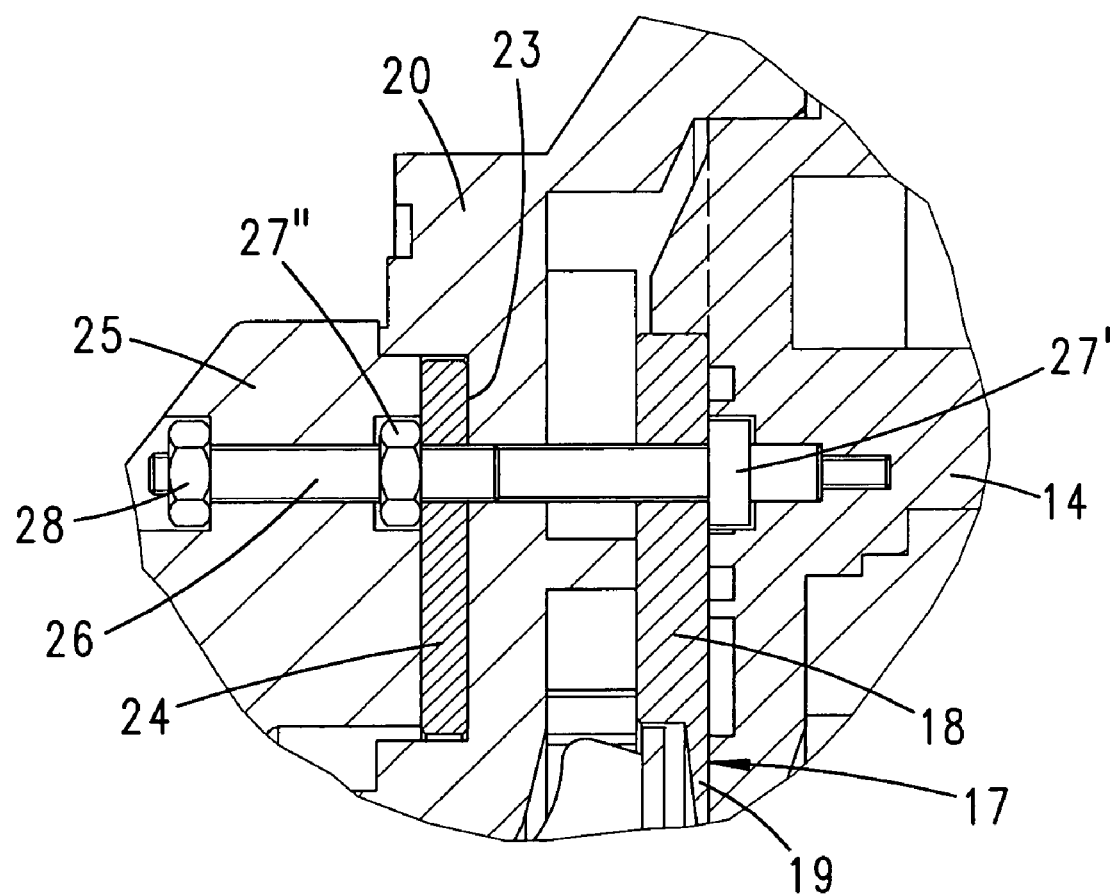
FIG. 8a shows the sectionally illustrated enlargement of the region VIIIa in FIG. 8.

Starting from a central region, the impeller 8 has radially outwardly extending blades 16, which have different heights in the radial direction, that is to say decrease in height in the radially outward direction. The radially outwardly oriented peripheral edges of the blades 16 are approximately concave in cross-section, for example according to the illustration in FIG. 8, and a height h' selected for the blades 16 in the region of the greatest radial extent of the blades 16, that is to say in the foot region of the impeller 8, this foot region being directed toward the cooling-channel housing 14, corresponds approximately to a quarter of the axially measured overall height h of the impeller 8.

That side of the cooling-channel housing 14 which is directed toward the impeller 8 is provided with a central, disk-like recessed portion 17. This has a larger diameter than the foot region of the impeller 8.

In the recessed portion 17, a cage plate 18 is located, which is annular in plan view. This cage plate consists of a hard and tough material, for example ST 50 steel. The external diameter of this cage plate 18 is adapted to the internal diameter of the recessed portion 17 in the cooling-channel housing. The internal diameter of the cage plate 18 is selected such that the impeller 8 has its greatest radial extent, that is to say the foot region, positioned in a freely rotating manner, with a small gap being left, in the annular space of the cage plate 18. Furthermore, the cage plate 18 is formed such that it engages beneath the impeller 8 in a radially inward direction. Correspondingly, an annular collar 19, which is less thick than the overall thickness of the cage plate 18, extends radially inward from the inner annular edge of the cage plate 18.

A diffuser 20, which is likewise formed as a rotationally symmetrical component, is secured on that side of the cage plate 18 which is directed away from the cooling-channel housing 14. This diffuser has a central inlet cross-section into which the impeller 8 penetrates. In addition, a radially outwardly opening annular gap 21 which remains directly above the cage plate 18 has diffuser blades 22 passing through it in a known manner, these diffuser blades evening out the gas flow which passes out radially and, in the process, increasing the gas pressure in the radially outward direction.

It is also the case that the diffuser 20 has on the upper side, which is directed away from the cage plate 18, an annular recess 23, which is oriented concentrically in relation to the shaft axis x. In this recess, a further cage plate 24 is located, which in the exemplary embodiment illustrated has a thickness, measured in the shaft-axis direction x, which corresponds approximately to two thirds of the thickness of the cage plate 18, which is provided on the underside of the diffuser 20. This cage plate 24 also consists of a hard and tough material such as ST 50 steel.

Finally, disposed on the cage plate 24 is a housing cover 25 which also engages over the funnel-like intake portion of the diffuser 20 and forms the axial gas inflow. This housing cover as well as the diffuser 20 and/or the cooling-channel housing 14 and/or the cooling-channel adapter part 15 and the housing 2 preferably consist of a light-metal casting material, for example aluminum.

The housing cover 25 and cooling-channel housing 14 are braced in relation to one another with the interposition of the two cage plates 24 and 18 and the diffuser 20. For this purpose, use is made of, in the exemplary embodiment illustrated, seven connecting means 26 which are distributed uniformly over the circumference and are in the form of studs 27 which have screw threads at least at the ends. These studs are screwed, at one end, to a limited extent into corresponding threaded bores of the cooling-channel housing 14, and then form guiding and securing studs which are correspondingly parallel to the shaft axis x. These studs 27, which are used in the manner of stay bolts, have radial collars 27' which are positioned in correspondingly shaped recesses in the cooling-channel housing 14 such that they are substantially flush with the associated surface of the cooling-channel housing 14. During assembly, first of all the lower cage plate 18 is pushed on in the axial direction over these studs 27—after which the impeller 8 is initially secured on the drive shaft 7—and then the diffuser 20 and the cage plate 24 are pushed on in the axial direction over the studs 27. This is followed by the cage plate 24 being secured axially by means of steel nuts 27" which are screwed onto the studs 27 and are positioned in correspondingly formed recessed portions of the housing cover 25, which is the last to be placed in position. The stud ends passing through the housing cover 25 have nuts 28 screwed onto them in order for the abovementioned components to be clamped in and secured.

It is also the case that the stud-like connecting means 26 and the radial collars 27' thereof and also the nuts 27" are formed from a hard and tough material such as ST 50 steel, and these accordingly form, together with the cage plates 18 and 24, a cage 29 which serves for protecting the housing 2 and the fan-portion components, for example the housing cover 25, in the event of the impeller 8 bursting.

The gap s which is left between the two cage plates 18 and 24, and through which in particular the diffuser blades 22 pass, covers only part of the height h of the impeller blades 16, that is to say approximately the region of half the height h and thus at least the height h' of the blades 16 at their greatest radial extent, that is to say in the vicinity of the foot region of the impeller 8.

The abovedescribed configuration of the cage 29 formed from hard and tough material ensures that, in the event of the impeller 8 bursting, large, and thus dangerous, fragments are not slung radially outward by centrifugal force. It also counteracts any fragment-induced damage to the housing cover 25 and/or the housing 2 or the cooling-channel housing 14, which is disposed on the underside of the gap s. The cage plates 24 here serve as a protective shield against destruction-induced enlargement of the radial gap. The respectively rearward support of the cage plates 18 and 24 on the collars 27' and nuts 27" reliably counteracts any gap enlargement between the cage plates 18 and 24 (cf. FIG. 8a).

In particular for the purpose of cooling the electric drive 4, the radial fan 1 has a cooling system, which is substantially divided in two. A primary cooling system is therefore provided, and this uses an internal gas flow which is closed off hermetically in the outward direction. A secondary cooling system is in the form of a water cooling means which, passing through the housing 2, is channeled outward, the water being delivered there by corresponding pumping means or the like.

The second cooling medium, which is designated by $K_2$ in the drawings, is the abovementioned internal gas flow of the primary cooling system. In this case, the difference in pressure, during operation of the radial fan 1, between the region of the radially outer periphery of the impeller 8 and the radially outer outlet region of the annular gap 21 of the diffuser is used in order to create an automatic flow which has no active assistance. A lower pressure P' thus prevails in the region of the radially outer periphery of the impeller 8 than at the radially outer outlet region of the annular gap 21. The pressure P, which is increased there as a result of the diffuser blades 22, corresponds approximately to twice the radially inner pressure P'.

The resulting difference in pressure is used in order to branch off a partial gas stream T from the main gas stream H which passes out radially, this partial gas stream then being fed via appropriate paths 30 in order to cool the electric drive 4. Re-entry of the partial gas stream into the main gas stream H is effected in the region of the lower pressure P', that is to say in the region of the radially outer periphery of the impeller 8, gas circulation being achieved as a result.

The gas is preferably helium and/or nitrogen and/or air and/or a mixture of two or more of the gases mentioned.

The abovedescribed paths 30 for the second cooling medium $K_2$ run substantially parallel to the shaft axis x and, furthermore, extend substantially between the cooling-channel housing 14 and the foot part 9 of the housing 2.

On the upper side, which is directed toward the cage plate 18, the cooling-channel housing 14 is provided with a plurality of, in the exemplary embodiment illustrated, with seven, labyrinthine housing paths 31 which open out in the radially outward direction, via a respective branch channel 32, in the radially outer region of the annular gap 21, in which the increased pressure P prevails during operation of the radial fan 1. The other end of each labyrinthine housing path merges toward the inside of the cooling-channel housing 14, as seen in the radial direction, into an axial channel 33, which is connected to a correspondingly positioned axial bore 34 in the annular part 15, this being associated with the housing 2.

The labyrinthine paths 31 take a meandering course as seen in a plan view of the cooling-channel housing 14, such a labyrinthine path 31 being provided in each interspace between two circumferentially adjacent stud-like connecting means 26.

The housing wall 35, which encloses the electric drive 4, is of solid configuration, and accordingly also forms a cooling body.

In extension of the axial bores 34 of the annular part 15, coolant channels 36 extend in the housing wall 35. These channels run parallel to the shaft axis x in the region of the cross-sectionally rounded corner regions between two adjacent plane surfaces 3. As can be seen, in particular, from the sectional illustration in FIG. 10, each corner region of the housing wall 35 is assigned three such coolant channels 36, which are each connected to a corresponding number of bores and channels in the annular part 15 and/or in the cooling-channel housing 14.

As has been mentioned, primary cooling takes place by means of the differential-pressure-controlled partial gas stream T separated off from the main gas stream H. This partial gas stream T, branching off from the radially outer position of the annular gap 21 in the region of the diffuser 20, is channeled radially inward through the labyrinthine paths 31 of the cooling-channel housing 14. The partial gas stream T then passes through the axial channels 33 of the cooling-channel housing 14, the axial bores 34 of the annular part 15 and the coolant channels 36 in the region of the housing walls 35 in order, finally, to be deflected through approximately 180°, by means of paths which have not been illustrated specifically, in that end of the housing 2 which is directed away from the impeller 8, in the region of the foot part 9 provided there. Part of the partial gas stream T is then channeled through the interspace between the rotor 6 and stator 5. A further part of the gas stream also flows through the drive shaft 7, which is formed as a hollow shaft, in order to pass out radially outward into the interior of the housing 2 in the region beneath the impeller 8. From this housing interior, the partial gas stream T passes back, in the low-pressure region P' in the vicinity of the radially outer periphery of the impeller 8, into the main gas stream which is to be compressed.

First cooling of the partial gas stream T takes place by way of contact with the housing wall 35. The cooling effect is increased further by the active, secondary cooling system. This is a water cooling means. This first cooling medium, which is designated by $K_1$, is channeled through paths 37 which, in the exemplary embodiment illustrated, run perpendicularly to the paths 30 of the second cooling medium $K_2$. These paths 37 thus run in the circumferential direction in relation to the shaft axis x, in doing so extending over an axial region which covers approximately the stator region.

In order to form the paths 37, in first instance chamber-like housing recesses 38, which initially open outward in cross-section, are provided in the outer wall of the housing 2, associated with the plane surfaces 3. These housing recesses are accordingly positioned in each case between two circumferentially adjacent, rounded corner regions of the housing wall 35, in which corner regions—as has been mentioned—the paths 30 for the second cooling medium $K_2$ are placed, the paths 30 running perpendicularly to these paths 37.

The, in the exemplary embodiment illustrated, four chamber-like housing recesses 38, which are offset at an angle of 90° in relation to one another, are flow-connected to one another by bores 39 which are placed such that housing material remains both in the direction of the stator 5, which is disposed inside the housing, and in the direction of the gas-flow paths 37, which run in the corner regions of the housing wall 35. Accordingly, the paths 37 of the first cooling medium $K_1$ and the paths 30 of the second cooling medium $K_2$ are separated from one another by uninterrupted material walls 40.

As an alternative to the bores 39 proposed, the connections between the housing recesses 38 may also be achieved in the casting process.

The flow-connection between the housing recesses 38 results in a path 37 for the first cooling medium $K_1$ which runs all the way around the circumference.

As seen in the axial direction, the chamber-like housing recesses 38 are bounded by integral walls 41 of the housing 2. The housing recesses 38 are delimited in the radially outward direction by means of plate-like coverings 42 which are secured in a sealing manner, in the region of the adjacent housing-corner formations, along the recess periphery running round the outer wall of the housing 2.

A covering 42 here is provided with a connection 43 in order to form a cooling-medium infeed 44. The covering 42 which is located diametrically opposite this covering likewise has a connection 43, for forming a cooling-medium discharge 45.

Figure 9:
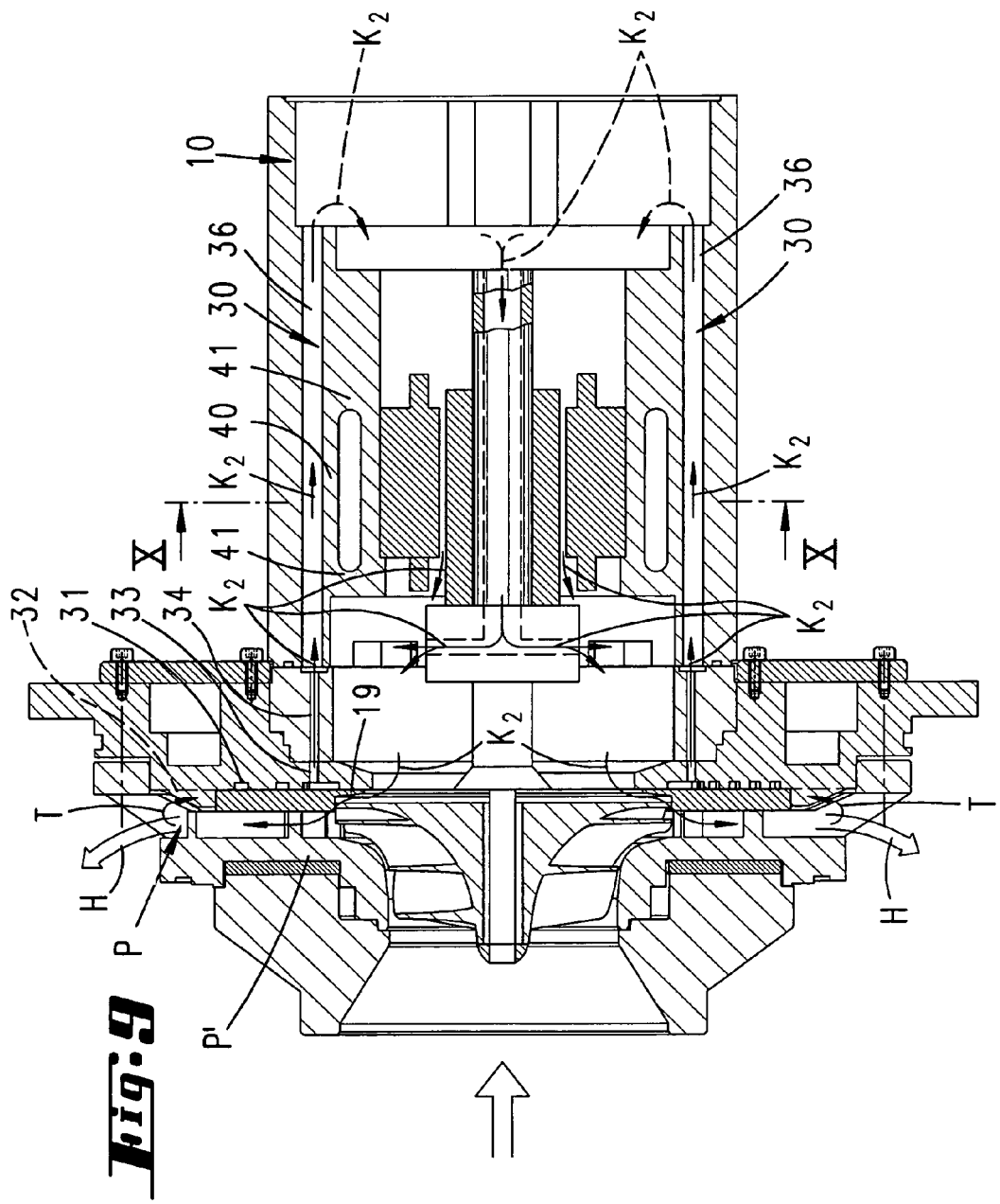
FIG. 9 shows the section along line IX-IX in FIG. 7.
Figure 10:
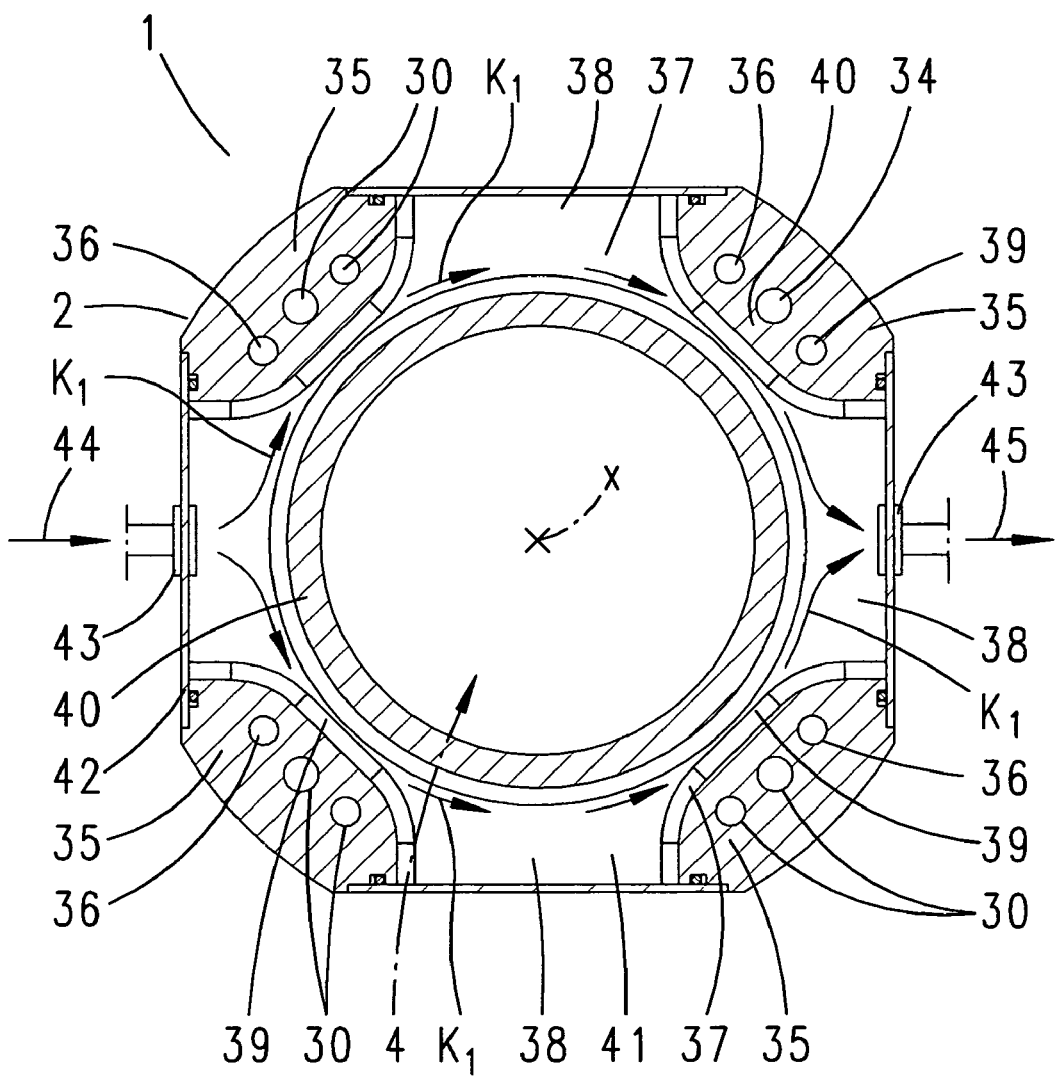
FIG. 10 shows the cross-section along line X-X in FIG. 9, here too with the electric drive having been left out.

As can also be seen, in particular, from the illustrations in FIGS. 9 and 10, the bores 39, which connect the chamber-like housing recesses 38, are configured as slot-like bores which extend approximately over the entire axial length of the stator 5, which is disposed in the housing interior.

The paths 37 of the first cooling medium $K_1$ (water circuit) are disposed further toward the inside, as seen in the radial direction, than the paths 30 of the second cooling medium $K_2$ (gas circuit), at least in the region between the chamber-like housing recesses 38, that is to say in the region of the solid housing-corner regions which accommodate the paths 30.

The paths 30 and 37 of the two cooling media $K_1$ and $K_2$ run at an angle in relation to one another, without any sealing means being used for separating the paths 30 and 37 from one another. This separation is achieved merely by way of intact housing material.

Figure 11:
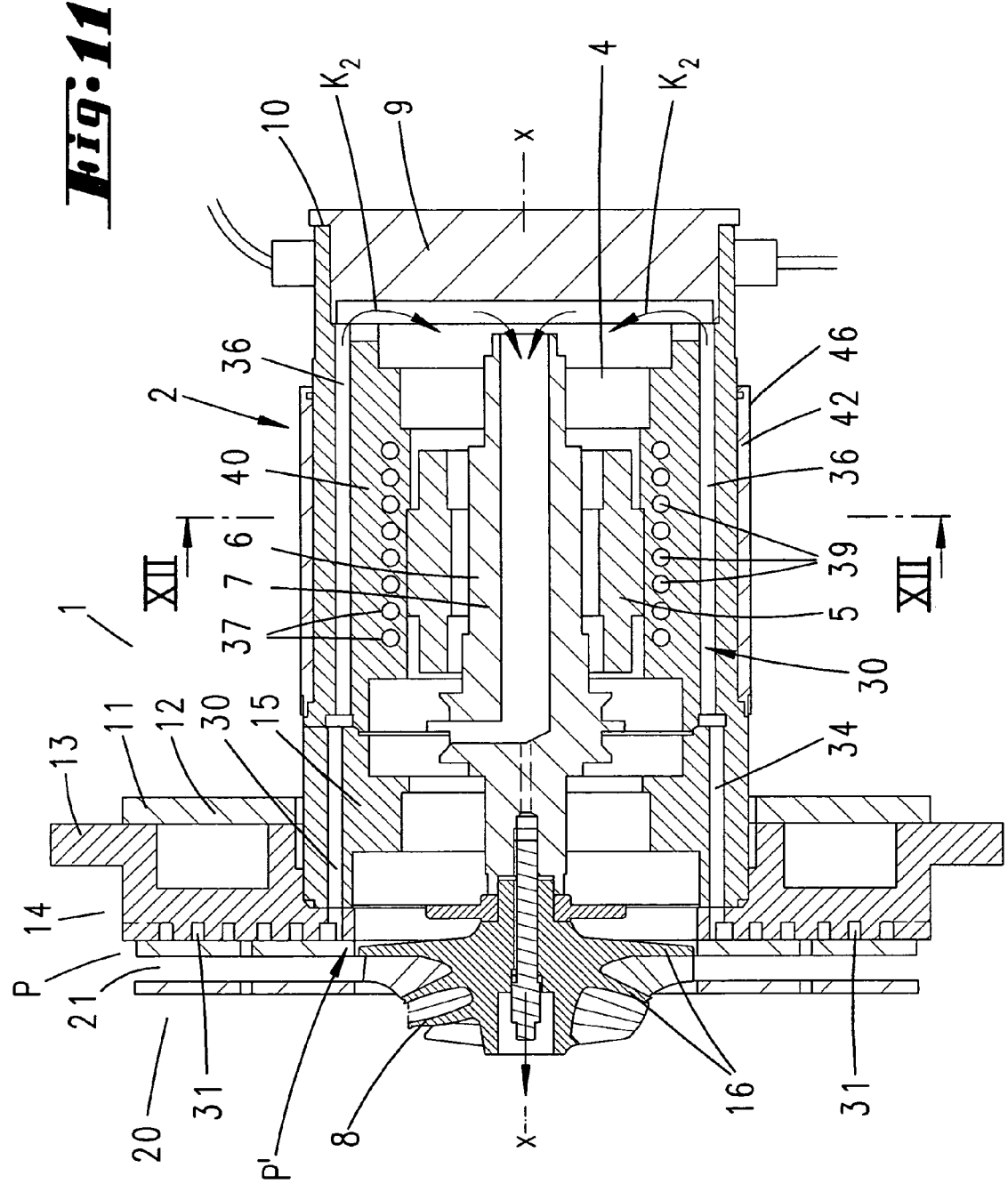
FIG. 11 shows a sectional illustration corresponding to FIG. 9, but relating to an alternative embodiment of the radial fan, the cage plates and the housing cover having been left out.
Figure 12:
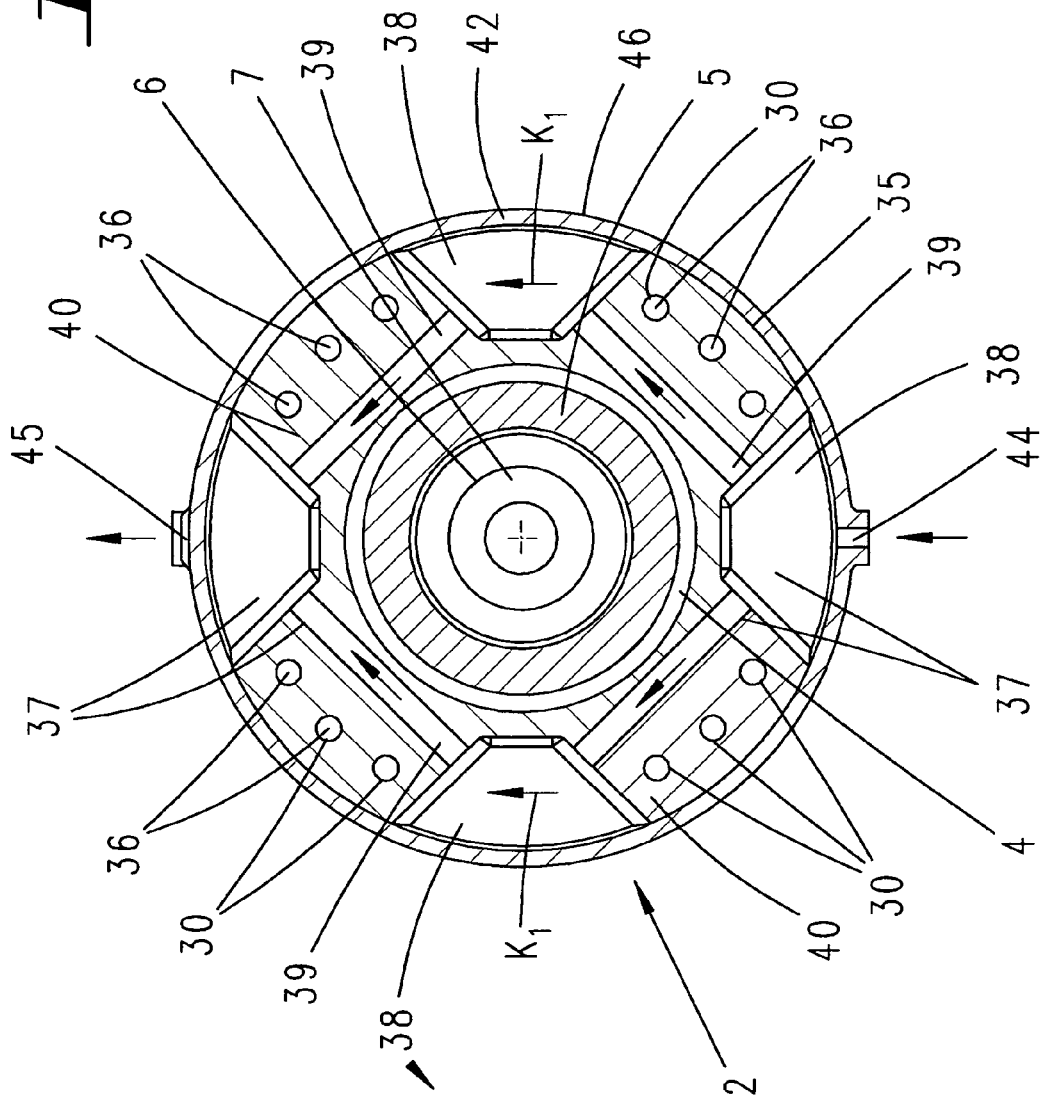
FIG. 12 shows the cross-section along line XII-XII in FIG. 11.
Figure 13:
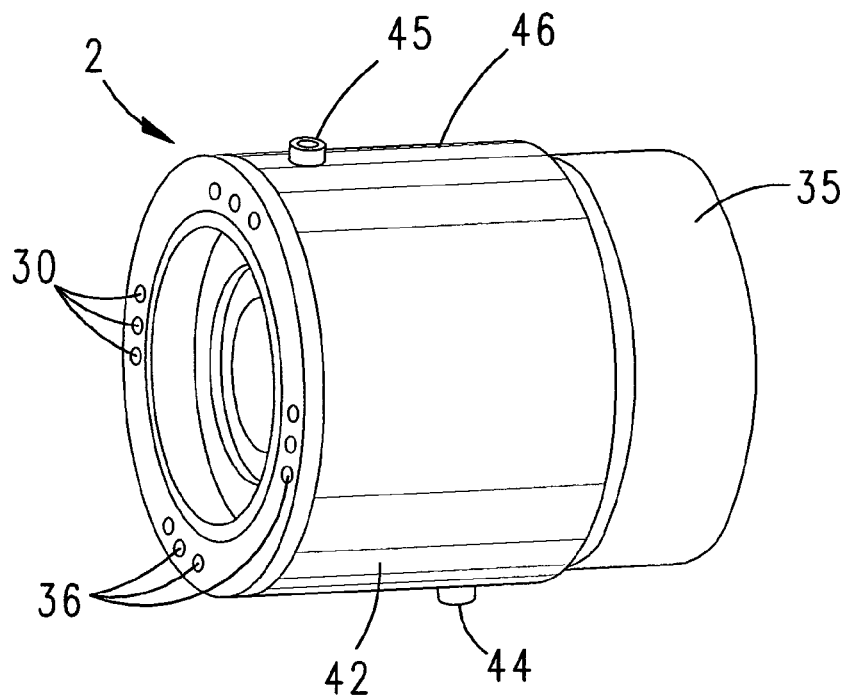
FIG. 13 shows a perspective illustration of the fan housing of the second embodiment.

FIGS. 11 to 13 show an alternative embodiment of the radial fan 1, in particular of the housing 2. The cage, the diffuser and the housing cover have been left out of the illustration for this embodiment.

The functioning and the general course taken by the cooling circuits correspond to those of the exemplary embodiment described above.

Figure 14:
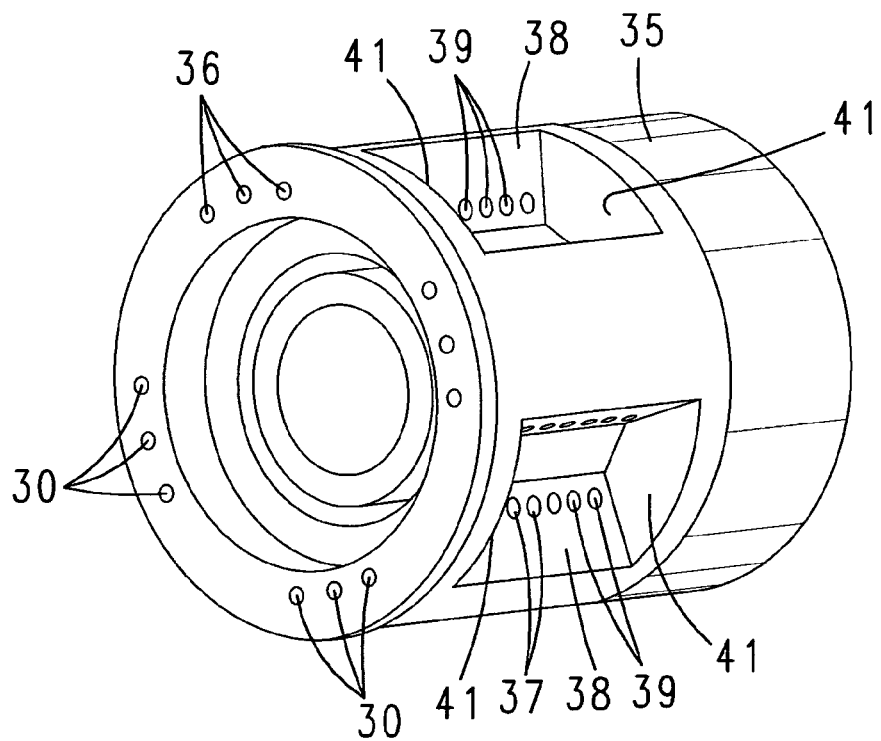
FIG. 14 shows a further perspective illustration of the housing with a covering which encloses the housing having been left out.

The essential difference resides in the overall configuration of the housing 2. In this second exemplary embodiment, this housing is substantially cylindrical throughout with a round cross-section. Four circumferentially uniformly distributed, chamber-like housing recesses 38 are formed in the solid housing wall 35 and intact housing-wall portions, which accommodate axially running paths 30 for the second cooling medium $K_2$, remain between them—as seen over the circumference. These paths 30 are associated with a radially outer region of these wall portions. The bores 39, which connect the chamber-like housing recesses 38, are provided in the radially inner region of these wall portions. As can be seen, in particular, from the perspective illustration in FIG. 14, each chamber-like housing recess 38 has a plurality of bores 39 which are disposed one behind the other in the direction of extent of the shaft axis x, which bores 39, in accordance with the sectional illustration in FIG. 11, cover substantially the region of extent of the stator as seen in the same direction.

In this second embodiment, the covering 42, which closes the chamber-like housing recesses 38, is formed. as a tubular part 46 which encloses the housing 2 and can be secured on the outside of the housing wall 35 by correspondingly positioned sealing means.

The cooling-medium infeed 44, on the one hand, and the cooling-medium discharge 45, on the other hand, are formed at two diametrically opposite regions, each associated with a chamber-like housing recess 38.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. A radial fan having an impeller and a housing assembly, the impeller having a periphery, a cover side, and an underside, the housing assembly comprising a cover, and at least the cover comprising a light-metal casting material, wherein, in order to form a cage which encloses the impeller, a cover-side cage plate is provided on the cover side and an underside cage plate is provided on the underside of the impeller, the cover-side and underside cage plates being held together around the periphery of the impeller by connectors, at least the connectors and the cover-side cage plate comprising a hard and tough material, wherein further the connectors are formed with steel collars or are provided with steel nuts in order to support the cover-side and underside cage plates at a respective rear portion of each of the cover-side and underside cage plates,
   wherein a diffuser part is disposed beneath the cover, and the cover-side cage plate is disposed between the cover and the diffuser part,
   wherein the impeller has blades, wherein in a radial direction the blades have a total range of different heights along a longitudinal axis of the impeller,
   wherein a gap formed by the cover-side and underside cage plates over a portion of the longitudinal axis of the impeller overlaps only a partial range of the total range of heights of the blades, and
   wherein the partial range includes at least a height of the blades at their greatest radial extent.

2. The radial fan according to claim 1, wherein the housing assembly is divided parallel to a plane of revolution of the impeller.

3. The radial fan according to claim 1, wherein each of the cover-side and underside cage plates comprises steel.

4. The radial fan according to claim 1, wherein the housing assembly comprises a light-metal casting.

5. The radial fan according to claim 1, wherein the connectors are screw-connected both in a first housing part and in the cover of the housing assembly.

6. The radial fan according to claim 1, wherein the connectors pass through the diffuser part.

7. The radial fan according to claim 1, wherein the housing assembly comprises a first housing part disposed beneath the impeller and a cooling-channel cover is fitted on a side of the first housing part which is directed away from the impeller.

8. The radial fan according to claim 1, wherein the connectors comprise studs having screw threads at an end of each of the studs.

9. The radial fan according to claim 1, wherein the cover-side and underside cage plates are formed as annular parts.

10. The radial fan according to claim 9, wherein an internal diameter of one of the cover-side and underside cage plates is larger than the external diameter of the impeller.

11. The radial fan according to claim 9, wherein the radial extent of one of the cover-side and underside cage plates corresponds to a radial dimension of the impeller or less.

12. The radial fan according to claim 1, wherein the underside cage plate extends axially into a foot region of the blades.

13. The radial fan according to claim 1, wherein the underside cage plate is located in a recessed portion of the housing assembly beneath the impeller and the underside cage plate extends in a radially inward direction from an outer wall of the recessed portion toward the impeller.

14. The radial fan according to claim 1, wherein the portion of the longitudinal axis over which the gap is formed defines a height of the gap, the height of the gap corresponds to half an overall height of the impeller along the longitudinal axis or less.

15. The radial fan according to claim 1, wherein the impeller has a diameter of 100 millimeters or more in the foot region, and at least one connector is provided for each 25 millimeters of diameter.

16. The radial fan according to claim 15, wherein the diameter is 150 millimeters, and six or more connectors are circumferentially distributed at uniform angles.

\* \* \* \* \*